United States Patent
Lee

(10) Patent No.: US 7,140,594 B2
(45) Date of Patent: Nov. 28, 2006

(54) OPENING/SHUTTING APPARATUS FOR FLOW CONTROL

(75) Inventor: Hyun-Dong Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 46 days.

(21) Appl. No.: 11/002,283

(22) Filed: Dec. 3, 2004

(65) Prior Publication Data

US 2005/0274922 A1 Dec. 15, 2005

(30) Foreign Application Priority Data

Jun. 9, 2004 (KR) ............... 10-2004-0042084

(51) Int. Cl.
*F16K 31/44* (2006.01)
(52) U.S. Cl. ..................................... 251/279
(58) Field of Classification Search ............... 251/279
See application file for complete search history.

(56) References Cited

U.S. PATENT DOCUMENTS 5,938,174 A * 8/1999 Gunder et al. ............... 251/326

6,386,511 B1 * 5/2002 Watanabe et al. ........... 251/301

FOREIGN PATENT DOCUMENTS

KR 1998-038245 9/1998
KR 10-2003-0055383 7/2003

OTHER PUBLICATIONS

English Language Abstract of KR 1998-038245.
English language Abstract of KR 10-2003-0055383.
U.S. Appl. No. 11/002,226 to Lee, filed Dec. 3, 2004.

* cited by examiner

*Primary Examiner*—J. Casimer Jacyna
(74) *Attorney, Agent, or Firm*—Greenblum & Bernstein, P.L.C.

(57) ABSTRACT

An opening/shutting apparatus for flow control includes a damper door that opens/shuts a fluid channel of an interior of a duct, a knob that adjusts the damper door, a link coupled to an end of the damper door, and a rod hinged with both the knob and the link, the rod transmitting a rotational force of the knob to the link. The rod is configured to have a hinged structure where one end thereof is hinged with the link and the other end is hinged with the knob, and, when the interior of the duct is hermetically sealed, a rotational center of the knob is placed on a straight extension line connecting respective hinged points of the rod.

4 Claims, 1 Drawing Sheet

OPENING/SHUTTING APPARATUS FOR FLOW CONTROL

RELATED APPLICATIONS

The present disclosure relates to subject matter contained in priority Korean Application No. 10-2004-0042084, filed on Jun. 9, 2004, which is herein expressly incorporated by reference in its entirety.

BACKGROUND OF THE INVENTION

1. Field of the Invention

The present invention relates to an opening/shutting apparatus for controlling a flow of fluid in a duct, and more particularly to an opening/shutting apparatus for flow control, in which pressure applied to a damper door by fluid when an interior of a duct is hermetically sealed is transmitted to a knob through link and rod, but is directed to a rotational center of the knob, thereby causing the sum of moments acting on the knob to amount to zero.

2. Description of the Related Art

Such an opening/shutting apparatus for flow control refers to one designed to rotate a knob to generate a rotational force, and to cause the rotational force to be transmitted through link and rod to a damper door located in a duct, so that the damper door rotates to open/shut a fluid channel.

In a conventional opening/shutting apparatus for flow control composed of a damper door, a link, a rod and a knob (Korean Patent Publication No. 10-2003-0055383), no means capable of supporting pressure applied to the damper door by fluid when an interior of a duct is hermetically sealed is separately provided. Hence, there is a problem in that the damper door is vibrated or that a sealed effect is deteriorated.

In order to address the foregoing problem, for example, Korean Utility Model Publication No. 20-1998-0038245 has proposed to add a separate means such as a locking step. However, this addition has an influence on operation of the knob to thus prevent the knob from being smoothly operated. In addition, this is responsible for increase in the number of components, which leads to increase of costs as well as unreliability of quality.

SUMMARY OF THE INVENTION

Therefore, the present invention is to solve the foregoing problems and/or disadvantages and to provide at least the advantages described hereinafter. Accordingly, the present invention is to resist pressure of fluid and maintain a hermetically sealed state using a mechanical structure without a separate locking step or spring when an interior of a duct is hermetically sealed.

In order to accomplish this objective, according to an aspect of the present invention, an opening/shutting apparatus for flow control comprises a damper door for opening/shutting a fluid channel of an interior of a duct, a knob for adjusting the damper door, and an intermediate unit for transmitting force acting on the knob to the damper door. The intermediate unit is composed of a link coupled to an end of the damper door, and a rod hinged with both the knob and the link and for transmitting a rotational force of the knob to the link. The rod is configured to have a hinged structure where one end thereof is hinged with the link and the other end is hinged with the knob. When the interior of the duct is hermetically sealed, a rotational center of the knob is placed on a straight extension line connecting respective hinged points of the rod.

More preferably, the rod is formed in a step shape where two bent parts exist, and has a rib formed to reinforce strength at a center thereof.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1:
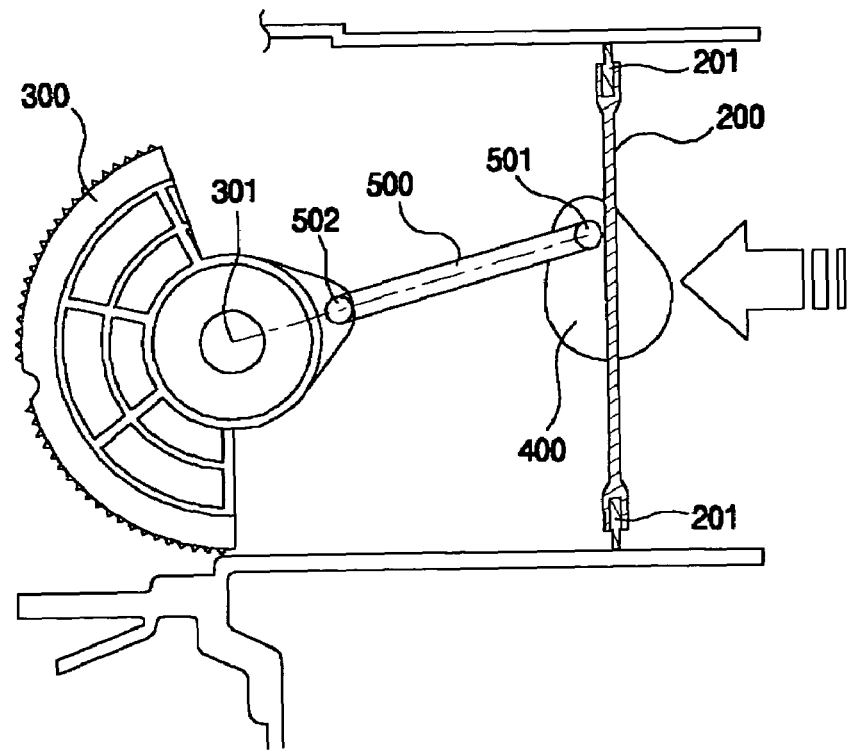
FIG. 1 is a cross-sectional view showing a first embodiment of an opening/shutting apparatus for flow control according to the present invention.

Hereinafter, exemplary embodiments of the invention will be described with reference to the accompanying drawings.

An opening/shutting apparatus for flow control according to the present invention comprises a damper door 200 opening/shutting an interior of a duct, a link 400 coupled to an end of the damper door 200 and having the same rotational center as the damper door, a rod 500 hinged to the link 400 on one end and to a knob 300 on the other end, and the knob 300 receiving an external force to generate a rotational force and transmitting the rotational force to the rod 500.

The damper door 200 has a pad 201 formed along an edge thereof, wherein the pad is axially rotatably supported at a center of the interior of the duct to open/shut the interior of the duct, and is for improve a sealed effect and for reduce a noise.

The damper door 200 is fixed to the link 400 on one end thereof, and has the same rotational axis as the link 400. The link 400 is hinged with the rod 500 on one end thereof.

The rod 500 is disposed between the link 400 and the knob 300 and has both opposite ends hinged to the link 400 and the knob 300 respectively. The rod 500 serves to transmit a rotational force of the knob 300 to the link 400.

Figure 2:
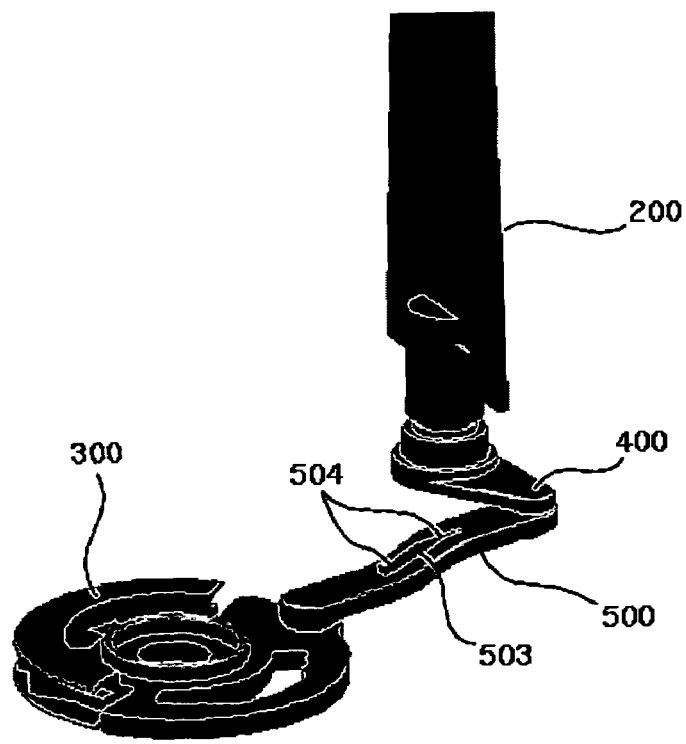
FIG. 2 is a cross-sectional view showing a second embodiment of an opening/shutting apparatus for flow control according to the present invention.

As shown in FIG. 2, the rod 500 preferably has two bent parts 504 formed in a step shape, wherein a rib 503 is formed between the two bent parts 504 in order to reinforce strength. The rib 503 is protruded in a direction identical or opposite to the damper door 200 in a part of longitudinal cross section of the rod. The rod 500 may become at least two in number. In this case, two or more rods may be combined into the rod 500.

The knob 300 serves to transmit force applied from the exterior to the damper door 200 through the rod 500 and the link 400 and thus to adjust opening/shutting of the interior of the duct.

As to a process where the interior of the duct is hermetically sealed, a user rotates the knob 300. When the knob 300 is rotated, the rod 500 hinged with the knob moves. Then, the rod 500 rotates the link 400 hinged therewith again. While rotating, the link 400 rotates the damper door 200 coupled on the same rotational axis. As a result, the interior of the duct is hermetically sealed.

When the damper door 200 is rotated to seal the interior of the duct as in FIG. 1, pressure of the fluid acts on the damper door. Here, the force acting on the damper door is transmitted to the knob through the link and the rod. In this process, a rotational center 301 is placed on a straight extension line connecting a first hinged point 501 of the rod 500 and the link 400 with a second hinged point 502 of the rod and the knob. In the case that the rod 500 is configured of two or more rods, hinged points between respective rods, the first hinged point 501 of the rod and the knob and the second hinged point 502 of the rod and the knob are all placed on a single straight extension line. The rotational center 301 is placed on the straight extension line.

With this configuration, the pressure acting on the damper door when the interior of the duct is sealed is transmitted to the rod 500 through the link 400. The rod 500 transmits the force to the rotational center of the knob 300, the sum of moments acting on the knob 300 amounts to zero. Therefore, it is possible to maintain stable sealed state without additional components such as the coupling protrusion 1, the spring or so forth.

Effects according to the present invention are summarized as follows.

First, it is possible to improve sealing reliability and to prevent movement of the damper door caused by external factors by use of a mechanical structure without any additional component such as a coupling protrusion, a spring or so forth when an interior of a duct is hermetically sealed.

Second, it is possible to transmit a rotational force of the knob to the link in a narrow space by forming the rod in a shape where two bent parts exist.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An opening/shutting apparatus for flow control comprising:
   a damper door that opens/shuts a fluid channel of an interior of a duct;
   a knob that adjusts the damper door;
   a link coupled to an end of the damper door; and
   a rod hinged with both the knob and the link, the rod transmitting a rotational force of the knob to the link,
   wherein the rod is configured to have a hinged structure where one end thereof is hinged with the link and the other end is hinged with the knob; and
   wherein when the interior of the duct is hermetically sealed, a rotational center of the knob is placed on a straight extension line connecting respective hinged points of the rod.

2. The opening/shutting apparatus for flow control according to claim 1, wherein the damper door comprises a plurality of pads provided along opposite edges thereof.

3. The opening/shutting apparatus for flow control according to claim 1,
   wherein the damper door is fixed to the link on one end thereof and has the same rotational axis as that of the link.

4. The opening/shutting apparatus for flow control according to claim 1, wherein the rod comprises:
   a plurality of bent parts formed in a step shape; and
   a rib provided between the bent parts.

* * * * *